United States Patent [19]

Suka et al.

[11] Patent Number: 4,711,938

[45] Date of Patent: Dec. 8, 1987

[54] PROCESS FOR PRODUCING POLYMETHYL METHACRYLATE

[75] Inventors: Motoshi Suka, 8-53, Fujimicho 3-chome, Higashimurayama-shi, Tokyo; Shinzo Omi, Tokyo, both of Japan

[73] Assignee: Motoshi Suka, Tokyo, Japan

[21] Appl. No.: 829,379

[22] Filed: Feb. 13, 1986

[30] Foreign Application Priority Data

Feb. 19, 1985 [JP] Japan .................................. 60-29237

[51] Int. Cl.[4] .................. C08F 2/02; C08F 120/14; C08F 220/14
[52] U.S. Cl. .................................. 526/88; 526/64; 526/329.2; 526/329.7; 528/501; 422/132
[58] Field of Search ............. 526/64, 88, 329.2, 329.7; 523/307; 528/501; 422/132

[56] References Cited

U.S. PATENT DOCUMENTS

| | | | |
|---|---|---|---|
| 3,466,269 | 9/1969 | Fivel | 526/88 X |
| 4,243,784 | 1/1981 | Akima et al. | 526/88 |
| 4,299,935 | 11/1981 | Chatelain | 526/88 |

FOREIGN PATENT DOCUMENTS 0213710 12/1984 Japan .................................. 526/329.7

Primary Examiner—Joseph L. Schofer
Assistant Examiner—F. M. Teskin
Attorney, Agent, or Firm—Panitch Schwarze Jacobs and Nadel

[57] ABSTRACT

A continuous process for producing polymethyl methacrylate (PMMA) or its copolymer comprises precooling a monomeric feedstock consisting of methyl methacrylate (MMA) or a mixture of MMA and up to 10 mol % of a highly thermal radical-forming monomer, forcing the feedstock into a reactor wherein a preceding charge is being circulated under pressure, instantaneously mixing the whole charge and cooling it by dint of the sensible heat of the monomeric feedstock, while thoroughly mixing the hot radicals, thus effecting the polymerization within a short time period, continuously taking out from the reactor the polymerization product and unreacted monomer or monomers being circulatingly mixed, at a polymerization product proportion of 50% by weight or less, conducting the mixture, while preheating it, into a vacuum vessel, removing therein the remaining monomer or monomers by evaporation, and then recovering the polymerization product.

5 Claims, 2 Drawing Figures

PROCESS FOR PRODUCING POLYMETHYL METHACRYLATE

BACKGROUND OF THE INVENTION

This invention is concerned with a process for producing polymethyl methacrylate.

Polymethyl methacrylate (hereinafter called "PMMA"), a resin with the best transparency among plastics, has long been used as windshields and in other similar applications. Since it is a material of a long history, various production methods depending on polymerization have been proposed. For the manufacture of the resin as an optical link material, however, none of them have proved satisfactory.

Among the proposed methods, first comes batch suspension polymerization that consists of polymerizing monomer particles batchwise in an aqueous dispersion and suspension containing a polymerization initiator. The process is still in wide use, but the batch operation usually requires a polymerization initiator (catalyst) which is eventually left unremoved in the product polymer, together with a suspending agent and the like, and the molecular weight distribution broadens. Also, the process necessarily involves such open stages as dehydration and drying which allow intrusion of impurities to mar the transparency of the product.

The second method comprises first preparing a syrupy intermediate polymer by batch bulk polymerization, placing the syrup in between two sheets of glass and effecting polymerization, and, following the conclusion of the polymerization, peeling off the glass sheets to obtain a sheet of PMMA. The process again needs a polymerization initiator and, because the polymerization is carried out while the resulting polymer is allowed to cool naturally between the glass sheets, the polymerization temperature becomes nonuniform and the polymerization degree distribution spreads objectionably. The result is poor transparency of the product.

The third is continuous bulk polymerization that can theoretically afford the most transparent product. According to the process disclosed, for example, by Japanese Patent Application Publication No. 32665/1977, a polymerization initiator is used and a syrupy intermediate polymer is formed in a prepolymerization vessel, and then in a second-stage polymerization vessel the intermediate is further polymerized to a final polymerization ratio $\phi \geq 0.5$. The two polymerization vessels use different polymerization temperatures, and this results in molecular weight distribution and compositional distribution as will be described later. Moreover, at $\phi \geq 0.5$, a gel effect accelerates the polymerization, and the rapid progress of polymerization causes partial temperature distribution and hence widened molecular weight distribution. Consequently, the product will not attain adequate transparency as an optical link material.

Generally, the molecular weight of PMMA is a function of the polymerization temperature and the amounts of the polymerization initiator, chain transfer agent such as ethylbenzene, and molecular weight modifier such as mercaptan contained in the feedstock. Together with proper amounts of these additives, the monomeric material is passed through a high-precision filter to a particle-free state. The mixture is then fed to a reactor and polymerization is carried out with stirring. In the case of batch or continuous [plug (piston) flow type] bulk polymerization, the reaction is effected at relatively low temperatures because the initial polymerization velocity is so high that the heat of polymerization is difficult to dissipate. The syrupy intermediate polymerization product thus obtained is transferred to a polymerization reactor, where the rest of polymerization reaction is performed.

FIG. 1 i a graphic representation of changes in the rates of reaction with time at different temperatures $T_1$, $T_2$, and $T_3$. The experiments showed that, with the same polymerization reactor and second-stage reactor, the polymerization reaction proceeded with sequential shifts of the temperature from the curve $T_1$ to $T_2$ and thence to $T_3$. Toward the end of reaction a gel effect accelerated the reaction, raising the rate of reaction to excess. Thus, the molecular weight distribution in the product PMMA spreads out to impair the transparency. The initiator and other additives partly left unremoved are also responsible for the low transparency of the product of ordinary bulk polymerization.

As described above, the conventional PMMA resins have not been satisfactory for high-precision applications such as optical fibers for optical links.

SUMMARY OF THE INVENTION

It is an object of the present invention to provide a process for producing PMMA free from impurities such as polymerization initiator or minute foreign particles and having narrow molecular weight distribution.

A more particular object of the invention is to provide a high-transparency PMMA suitable as an optical link material in the form of optical fiber or the like.

The objects are realized, in accordance with the invention, by a continuous process for producing PMMA or a copolymer in which methyl methacrylate (hereinafter called "MMA") is a monomer thereof which comprises precooling methyl methacrylate or a monomeric mixture comprising MMA and up to 10 mol% of styrene or other highly thermal radical-forming monomer, forcing the feedstock into a material polymerization product mixture being circulated under pressure within a reactor, instantaneously mixing the whole charge with vigorous stirring, cooling the same by dint of the sensible heat of the feedstock, taking out the polymerization product and unreacted monomer or monomers at a polymerization rate of 50% or below from the reactor, and conducting the mixture, while preheating the same, to a vacuum vessel, and therein removing the remaining monomer or monomers by evaporation.

Under the invention, rapid temperature rise in the initial polymerization reaction is avoided, and therefore the initial polymerization at low temperature, as in the usual process, is not necessary. MMA alone or together with a thermal radical-forming monomer can be instantaneously heated to a predetermined temperature and then kept at a substantially constant level for reaction. Accordingly, the rate of reaction is constant throughout the reaction period, and the molecular weight distribution of the resultant polymer is very narrow, giving PMMA of great transparency. The invention uses no additive such as polymerization initiator (catalyst), except for a monomer capable of forming thermal radicals, and hence the absence of foreign particles adds to the clarity of the product.

DETAILED DESCRIPTION OF THE INVENTION

Figure 1:
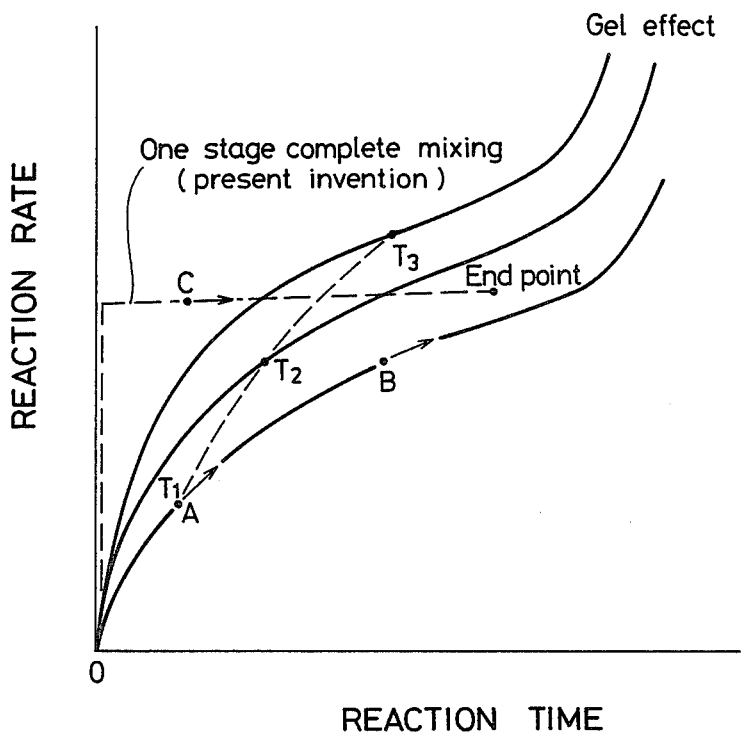
FIG. 1 is a graph comparing the PMMA polymerization characteristics according to the present invention with those by a conventional process.

FIG. 1 illustrates the basic difference between this invention and the prior art. The process of the invention is represented by a broken line extended past the point C. As soon as the feedstock monomer or monomeric mixture is forced into a reactor, it is mixed with the surrounding monomer-polymerization product mixture being reacted therein with circulation and is instantaneously heated to a given temperature. The monomer-polymer mixture in circulation, on the other hand, is kept from further temperature rise by the sensible heat of the precooled monomeric feedstock. After the initial mixing, the whole mixture is kept at a substantially constant reaction temperature since it is circulated in the reaction vessel being cooled from the outside. Accordingly, the molecular weight distribution too is kept constant.

Figure 2:
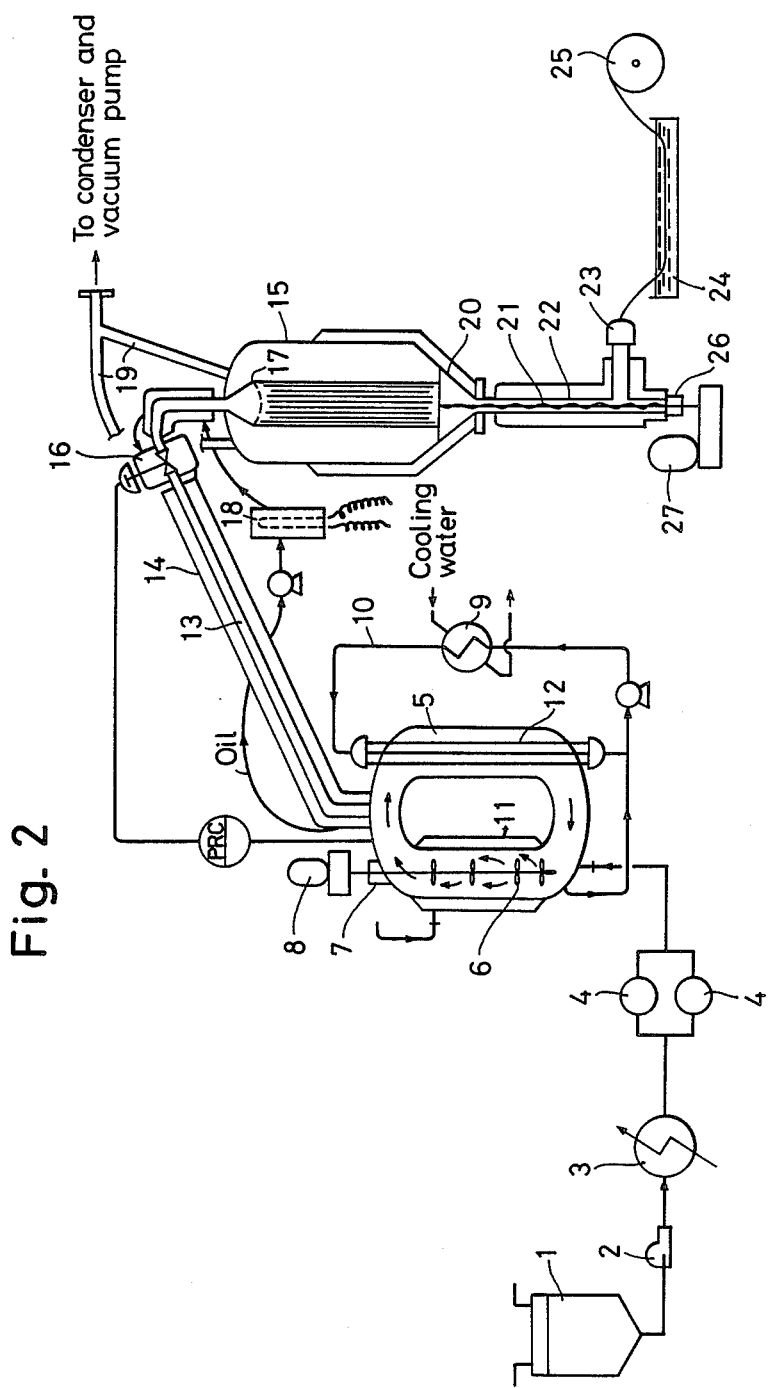
FIG. 2 is a schematic view of arrangements for embodying the process of the invention.

FIG. 2 schematically shows a typical production system embodying the process of the invention. Referring specifically to the figure, the present invention will now be described in detail.

A feedstock monomer, MMA alone or a mixture of MMA and up to 10 mol% of a monomer highly capable of thermal radical formation, especially styrene, is charged into a tank 1. One of the important features of the invention is that no additive such as a polymerization initiator (catalyst) that can impair the light transmission or reduce the purity of the product is employed. Thermal radical formation by MMA alone is rather insufficient and is preferably aided by the addition of styrene. The polymerization reaction in the early stage progresses rapidly to form abundant hot radicals. Then, styrene is no longer needed and its proportion may be gradually decreased. The upper space of the tank 1 is filled up with nitrogen to keep off air.

The monomeric feedstock is forced by a pump 2 into a brine precooler 3, where it is precooled, for example, to 15° C. or downwards. The precooling temperature is dictated by the reaction temperature in the polymerization reactor, the temperature of the monomer-polymerization product mixture being circulated under pressure in the reactor with external cooling, the circulation velocity, and other factors.

The feedstock is passed through a super-precision filter 4 to a particle-free condition. Whether the precooling should precede the filtration or not is of little significance, and where a sufficiently refined monomer or monomers are used, the filter 4 may be omitted.

Next, the feedstock is forced into a polymerization reactor 5. As will be explained later, the reactor 5 is sealed by a monomer-product polymer mixture filling up the space. The monomeric feed being pumped into the vessel, therefore, is at a pressure higher than the internal pressure of the reactor. For example, when the vapor pressure of the reactant solution is 35 kg/cm$^2$G, the feed pressure should be equal to or higher than that value.

The feedstock thus fed into the reactor 5 is polymerized at higher temperatures than usual, or over a relatively high predetermined temperature range, for example, of 140°–170° C. The initial polymerization reaction progresses rapidly and generates a large amount of heat, necessitating uniform removal of it to maintain a constant reaction temperature. This requirement is met in accordance with the invention by the following construction. As shown in FIG. 2, the reactor 5 is built in the form of a circulating draft tube, and a high-efficiency propeller-type agitator 6 is accommodated in one leg of the tubular structure and is driven for rotation by an external motor 8 through shaft and seal means 7. The agitator 6 comprises, for example, three high-efficiency marine-type propellers held in series on a shaft within the draft tube. It is driven with sufficient power input to effect circulation of a volume 200 to 300 times the feedstock supply. Thus, the agitator performs instantaneous mixing of the feedstock with the mixture of unreacted monomer and polymerization product. The sensible heat of the feedstock is diffused and taken up by the reactant solution as quickly as the complete mixing occurs. Cooling oil from a cooler 9, supplied via cooling oil line 10, is circulated through a jacket 11 around the draft tube section of the reactor 5 accommodating the agitator 6. Through the other vertical tube section on the opposite side, a plurality of cooling pipes 12 extend and circulates cooling oil therein to prevent temperature rise of the unreacted monomer-polymerization product mixture to maintain a predetermined temperature level. The temperature inside the reactor is thus kept uniform by the precooling of the monomeric feedstock, external cooling by the jacket 11 and pipes 12, and stirring and circulation by the agitator 6. Maintenance of the relatively high constant temperature ensures relatively speedy reaction and enhanced production efficiency.

It has already been explained in conjunction with FIG. 1 that the polymerization of MMA is accelerated toward the end of reaction by the gel effect. This must be avoided by reducing the proportion of the polymerization product in the liquid reaction mixture to 50% or less and thereby terminating the polymerization midway. The gel effect can be dramatically suppressed by the addition of a small percentage of styrene to MMA. The region of polymerization reaction occupies the entire reactor space that is filled up with the reactant solution, the feed being introduced at the bottom with a corresponding overflow at the top. In other words, the reaction region is all under pressure high enough to keep off minute impurities through the propeller shaft part or elsewhere. Also, in the absence of gas phase within the reactor, there is no possibility of the reactant solution polymerizing on any wall portion between gas and liquid phases to form solid deposits thereon.

Generally, in copolymerization with the addition of a comonomer or comonomers, the difference in polymerization reaction velocity among the participant monomers produces an adverse effect. In a batch or continuous piston-flow reaction, for example, along a full-line curve in FIG. 1, the copolymer produced at point A is dissimilar in composition to the copolymer at point B, even though the same polymerization temperature is used. The compositional ratios of such polymerization reaction products, after all, scatter around the average value. Strictly speaking, this leads to a slight difference in refractive index and to a decrease in transparency, though to a slight degree. In the process of the invention, by contrast, the addition of a comonomer does not cause the uneven compositional distribution, but brings uniform copolymer composition throughout. This is ascribable to the fact that, as described above, the feedstock is forced into the polymerization reaction solution being circulated at a rate 200 to 300 times as high as the feed rate to effect complete mixing, and the heat of polymerization reaction is absorbed to a large measure by dint of the sensible heat of the feedstock, so that the polymer proportion in the polymerization product is kept constant as at level C in FIG. 1. Thus, the refractive index is constant throughout the product to a great advantage from the standpoint of light transmission.

The polymerization product, polymerized to an extent such that the product polymer accounts for nearly 50% of the total amount, is forced out of the reactor at an outlet at the top formed opposite to the bottom inlet, in a volume equivalent to that of the incoming feedstock. The outgoing liquid then flows through the inner pipe 13 of a double-pipe duct toward a vacuum evaporator 15. The stream of polymerization product passing through the inner pipe 13 is heated from outside by oil heated under proper temperature control by a heater 18 and being circulated through the outer pipe 14. Because the outlet of the double-pipe duct is connected to the vacuum evaporator 15, the stream is quickly drawn by suction into the latter. The flow rate is regulated by an automatic pressure control valve 16 installed at the end of the duct. The polymerization product flowing out of the polymerization reactor 5 undergoes partial, additional polymerization on the way, forming some low-molecular-weight polymer. As the fluid approaches the vacuum evaporator with a gradual pressure drop, bubbling takes place. The specific volume (the reciprocal of the density) is maximized, the flow rate boosted, and the residence time minimized. Consequently, the formation of the low-molecular-weight polymer is limited to a minimum. An inlet nozzle 17 of the vacuum evaporator 15 has a number of nozzle openings as shown in FIG. 2, and the incoming fluid falls in the form of strings while foaming, expanding its surface area of contact with the vacuum of about 1 to 10 Torr. Active evaporation from the surface removes the volatile contents almost completely before the fluid reaches the bottom of the vessel. The volatile matter is extracted through line 19 to a condenser not shown.

The polymerization product that has fallen to the bottom 20 of the vacuum evaporator, almost completely free from the volatile matter, is difficult to discharge because it is very viscous and, moreover, is in a vacuum. Conventionally, the discharging in such a case is done by the use of a gear pump or by gear-pumping followed by a pressure increase and extrusion by an extruder. Neither is appropriate, however, for the obtainment of high-purity PMMA of the optical link or optical device grade to which the present invention is directed. The gear pump necessarily involves friction between the teeth in mesh, and the friction between the side faces of the teeth and the side plates of the casing can scarcely be eliminated. In addition, the upper half of the center shaft seal is exposed to vacuum, and even a high-grade mechanical seal is unable to avoid completely the intrusion of the sealing fluid. Thus, a trace of metal particles that results from abrasion of the gear teeth and a slight leak of sealing fluid can cause irregular reflection or refraction of light, eventually reducing the transparency of the product.

According to the process of the invention, the polymerization product is discharged downward from the bottom 20 of the vacuum vessel by means of a vertical screw 21 partly inserted into the bottom part, like starch syrup drawn out of a jar with the aid of a stick being twisted by hand. By the motion of the vertical screw with respect to a vertical duct 22, the polymerization product is subjected to increasing pressure as it is carried downward away from the evaporator bottom. Subsequently, its direction is shifted sideways, and the polymer is extruded through a nozzle 23 into a filament form. The filament in turn is passed through a warm water trough 24 and is wound up on a reel 25.

The vertical screw 21 too requires shaft seal means. To this end there is provided a shaft seal 26, as shown in FIG. 2, at a point (the lowermost end) where the polymer drawn out of the bottom 20 of the vacuum vessel has attained sufficient pressure by the screwing downward within the duct to overcome the nozzle resistance. The shaft seal might allow the highly viscous polymer to leak out but, on the other hand, precludes any possibility of intrusion from the outside of oxygen that discolors the polymer or of fine dust or the like that can objectionably scatter the light through the product. The numeral 27 indicates a motor that drives the screw 21 through transmission means not shown.

The present invention thus establishes a process for producing transparent, pure PMMA-base polymer, polystyrene or the like, with little molecular weight distribution and no compositional distribution, by combining all the countermeasures described above, thereby preventing the intrusion of whatever fine dust that can cause objectionable scatter of light or of oxygen that can discolor the resulting polymer, and also avoiding the formation of metal particles due to abrasion of metal parts.

Advantages of the invention over the prior art will be illustrated by a few examples thereof as follows.

PREPARATORY EXPERIMENTS

In order to evaluate the effect of the addition of styrene, four different monomeric feedstocks were prepared by adding 0, 10, 5, and 0 mol% styrene to MMA and they were polymerized separately in the following manner. The experiments were numbered 1, 2, 3, and 4, respectively (Experiment Nos. 1 and 4 differing in the date of experiment).

In each experiment the polymerization was started with oil bath heating, while condensing the monomeric vapor by Dimroth condensers (two arranged in tandem) having adequate condensation capacity, in a reactor of glass with a capacity of 500 ml. The reaction was initially effected at a constant boiling-point temperature. The boiling point rose with the formation of polymer. In the latter stage of polymerization where the polymer production increased, the reaction was carried out at 140° C., keeping the temperature constant by cooling from the outside.

Before the start of the reaction, nitrogen gas was continuously introduced into the reactor to replace air. The monomer or monomers were fed and the reaction continued while maintaining the above atmosphere. Throughout the experiments a small amount of nitrogen was supplied to the system.

The agitation impeller used was of the crescent (paddle) type. It was driven at a constant speed of 300 rpm.

Following the conclusion of the reaction, the polymer was separated from the unreacted monomer or monomers by precipitation in methanol, dried by a hot air drier at 60° C., and weighed.

The polymerization rate was determined, after the treatment of the entire quantity of the reaction product, by dividing the weight of the resultant polymer by the total weight of the reactant solution. The experimental results are summarized in Table 1.

TABLE 1

| Exp. No. | Reac. time | MMA (ml) | Styrene (ml) | Styrene (mol %) | Polymn rate | Mn ($10^{-4}$) | Mw ($10^{-4}$) |
|---|---|---|---|---|---|---|---|
| 1 | 10 | 250 | 0 | 0 | 0.196 | 75.8 | 144.1 |
| 2 | 10 | 250 | 25 | 10 | 0.352 | 56.1 | 105.6 |
| 3 | 10 | 237.5 | 12.5 | 5 | 0.445 | 27.7 | 82.3 |
| 4 | 6 | 250 | 0 | 0 | 0.099 | 46.6 | 105.0 |

TABLE 2

| Exp. No. | Feedstock | Polymn reac. temp. | Feed rate | Residence time | Outlet polymer | Mol. wt. of product polymer as PS, Mn |
|---|---|---|---|---|---|---|
| 5 | 5 mol % ST bal. MMA | 155° C. | 3.39 l/hr | 5.9 h | 49.5% | 130,000 |
| 6 | 5 mol % ST bal. MMA | 160° C. | 4.29 l/hr | 4.66 h | 49.0% | 116,000 |
| 7 | 100% MMA | 155° C. | 3.05 l/hr | 6.55 h | 49.5% | 138,000 |

The results indicate the following:

(1) The polymerization rates attained in Experiment Nos. 2 and 3 in which styrene was added were by far the greater than in Experiment Nos. 1 and 4 where MMA alone was polymerized, showing that the additional monomer promoted the reactions in the former. The results demonstrate that the addition of styrene inhibits the tendency inherent to MMA of gelation at low rates of polymerization, while boosting the reaction velocity.

(2) Of the polymerization rates achieved in Experiment Nos. 2 and 3, the rate in No. 3 using less styrene was higher. This is not unlikely when the reaction mechanism is taken into consideration.

If styrene is taken as a thermal polymerization initiator, it is only required to be present in a small amount. Then, presumably, Experiment No. 3 that used a greater proportion of MMA attained a higher reaction velocity owing to the rapid achievement of a gel effect characteristic of MMA.

EXAMPLES

The process of the invention was carried into practice in the manner illustrated in FIG. 2 and described above. MMA was mixed with 5, 5, or 0 mol% styrene. Each monomeric feedstock was precooled to 15° C., passed through a super-precision filter, and was continuously forced, at a feed rate given in Table 2, into a polymerization reactor 5 having a capacity of 20 l. The pressure inside the reactor was 4 kg/cm²G, and the polymerization reaction temperature (at the location of the agitator) and other conditions were as given in the same table. The circulation velocity of the polymerization product-unreacted monomer mixture in the reactor was about 290 times greater than the supply of the monomeric feedstock, so that the dispersion of the sensible heat of the monomeric material and the exchange of heat could be effected instantaneously. When the proportion of the polymerization product approached about 50% by weight, the polymerization product-unreacted monomer mixture was drawn out of the outlet. The amount drawn out was the same as the amount of the material fed into the vessel. The polymer amount at the outlet is governed by controlling the relations among the capacity of the reactor, the amount of discharge (or the residence time), reaction temperature, and circulation velocity. The polymerization product-unreacted monomer mixture thus drawn out was separated in a vacuum vessel, and the polymer content and molecular weight were determined. The results are also given in Table 2. The molecular weight distribution was very narrow, and the dispersion index ($\overline{Mw}/\overline{Mn}$) was 1.76.

Comparisons of these experimental results with those of known processes including Japanese Patent Application Publication No. 32665/1977 will clearly show the superiority of the present invention. According to the invention, a highly transparent MMA-base polymer suitable for fabrication into optical links, optical devices and the like can be manufactured without the addition of any catalyst or additive, while avoiding the intrusion of objectionable shaft-sealing fluid, metal particles, or dirt into the product.

What is claimed is:

1. A continuous process for thermally producing polymethyl methacrylate (PMMA) or a copolymer in which methyl methacrylate (MMA) is a monomer thereof, which comprises precooling a monomeric feedstock comprising MMA or a mixture of MMA and up to 10 mol% of a monomer highly capable of forming thermal radicals, forcing the feedstock into a reactor wherein a charge consisting of the monomers and polymerization product thereof is being circulated under pressure while being cooled externally, instantaneously mixing the feedstock and the charge while cooling the charge by dint of the sensible heat of the feedstock, thoroughly mixing the charge, continuously taking out from the reactor a portion of the charge consisting essentially of unreacted feedstock and the polymerization product at a polymerization product proportion of 50% by weight or less, conducting the portion, while preheating the same, into a vacuum vessel, removing therein remaining monomer or monomers by evaporation, and thereafter recovering the polymerization product.

2. A process according to claim 1 wherein the highly thermal radical-forming monomer is styrene.

3. A process according to claim 1 wherein the polymerization product-unreacted monomer mixture in the reactor is circulated at a velocity of 200 to 300 times as high as the velocity of the monomeric feedstock being forced thereinto.

4. A process according to claim 1 wherein the mixing is done by vigorous stirring.

5. A process according to claim 1 wherein the reactor is cooled at all times from the outside during polymerization.

* * * * *